(12) United States Patent
Beard (10) Patent No.: US 9,931,986 B2
(45) Date of Patent: Apr. 3, 2018

(54) MOBILE REFUELING VESSEL (71) Applicant: MRB Enterprise Inc., Mt. Pleasant, MI (US)

(72) Inventor: Mark William Beard, Mt. Pleasant, MI (US)

(73) Assignee: MRB Enterprise Inc., Mt. Pleasant, MI (US)

( * ) Notice: Subject to any disclaimer, the term of this patent is extended or adjusted under 35 U.S.C. 154(b) by 347 days.

(21) Appl. No.: 14/629,889

(22) Filed: Feb. 24, 2015

(65) Prior Publication Data
US 2016/0244252 A1 Aug. 25, 2016

(51) Int. Cl.
*B60P 3/22* (2006.01)
*B60R 3/00* (2006.01)
*B62D 63/08* (2006.01)
*B60R 3/02* (2006.01)

(52) U.S. Cl.
CPC ............ *B60R 3/007* (2013.01); *B60P 3/2215* (2013.01); *B60P 3/2245* (2013.01); *B60R 3/005* (2013.01); *B60R 3/02* (2013.01); *B62D 63/08* (2013.01)

(58) Field of Classification Search
CPC .................................. B60P 3/22; B60R 3/005
USPC ................................................. 280/837, 839
See application file for complete search history.

(56) References Cited

U.S. PATENT DOCUMENTS

| 3,960,389 | A | * | 6/1976 | Narahari | B60G 9/003 |
| | | | | | 267/243 |
| 5,213,367 | A | * | 5/1993 | Norman, Jr. | B60P 3/224 |
| | | | | | 182/113 |
| 8,113,314 | B2 | * | 2/2012 | Kennedy | B60R 3/02 |
| | | | | | 182/62.5 |
| 8,328,040 | B2 | * | 12/2012 | Ries | B65D 88/12 |
| | | | | | 220/562 |
| 8,496,270 | B2 | * | 7/2013 | Nothof | B60P 3/00 |
| | | | | | 220/562 |
| 8,893,853 | B2 | * | 11/2014 | Kennedy | B60R 3/02 |
| | | | | | 182/62.5 |
| 9,382,758 | B2 | * | 7/2016 | Kennedy | B60R 3/02 |
| 9,403,486 | B2 | * | 8/2016 | May | B60R 3/005 |
| 2013/0153324 | A1 | * | 6/2013 | Kissel, Jr. | B62D 21/152 |
| | | | | | 180/253 |
| 2014/0174851 | A1 | * | 6/2014 | Kennedy | E06C 5/04 |
| | | | | | 182/84 |
| 2015/0115589 | A1 | * | 4/2015 | Thiessen | B60P 3/2295 |
| | | | | | 280/837 |

OTHER PUBLICATIONS

Stanwade Metal Products, Inc., "15,000 Gallon Doublewall Beamskid", (1990) 1 page, Hartford, OH.; US.

(Continued)

*Primary Examiner* — Joseph M Rocca
*Assistant Examiner* — Conan D Duda
(74) *Attorney, Agent, or Firm* — Harness, Dickey & Pierce, P.L.C.

(57) ABSTRACT

A mobile vessel for refueling engines at remote refueling sites. The vessel has a tank with side walls and a rectangular bottom portion. The bottom portion is configured to rest on the ground and it includes an inner wall and a lower plate. The bottom portion further includes spacer elements between the inner wall and lower plate that defines a gap there between for collecting fuel that may leak from the tank.

10 Claims, 8 Drawing Sheets

(56) References Cited

OTHER PUBLICATIONS

Stanwade Metal Products, Inc., "20,000 Gallon Doublewall Beamskid",(1990) 1 page, Hartford, OH, US.
Beard Oil, "Fueling Installation / Onsite Fuel Storage", (2008), 1 page, Mt. Pleasant, MI, US.

* cited by examiner

MOBILE REFUELING VESSEL

FIELD

The present disclosure relates to fuel tanks and, more particularly, to a transportable fuel tank that may be used to refuel engines at remote locations such as construction sites and the like.

BACKGROUND

This section provides background information related to the present disclosure which is not necessarily prior art.

In some instances, it is impractical for a vehicle to travel to a gas station or the like to be refueled. Construction sites are an example. These sites are often remotely located and employ numerous pieces of construction equipment such as trucks, bulldozers, and other vehicles having engines that need to be refueled periodically. Since it is not practical for these pieces of construction equipment to travel very far, it is preferable to bring a refueling option to the construction site so that the equipment can be refueled without having to travel very far.

One example of a typical refueling option is a single-walled spherical tank that contains fuel. Precautions are often mandated for ecological reasons to minimize contamination of the environment in the event of a leak in the tank. Typical of such precautions are berms and/or bladders that surround the tank to contain any fuel that may leak from the tank. Unfortunately, these precautions are expensive, are not easy to maintain, and may not totally be effective.

SUMMARY

This section provides a general summary of the disclosure, and is not a comprehensive disclosure of its full scope or all of its features.

In accordance with the teachings of the present invention, a mobile vessel for refueling engines at remote refueling sites is provided. The vessel has a tank with sidewalls and a rectangular bottom portion. The bottom portion is configured to rest on the ground. The bottom portion includes an inner wall, a lower plate and spacer elements between the inner wall and lower plate that define a gap there between for collecting fuel that may leak from the tank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
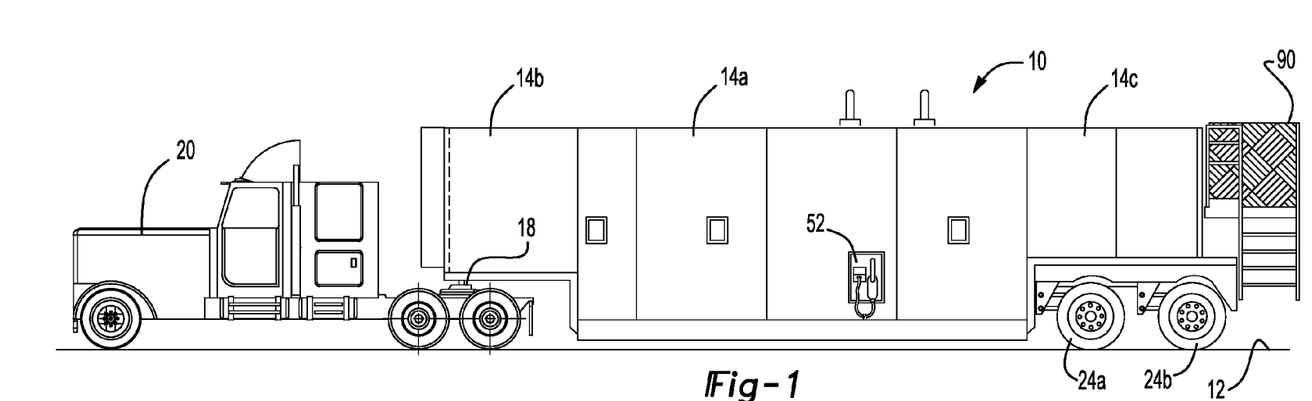
FIG. 1 is a side view of a mobile refueling vessel made in accordance with the teachings of the present invention, while being transported.
Figure 2:
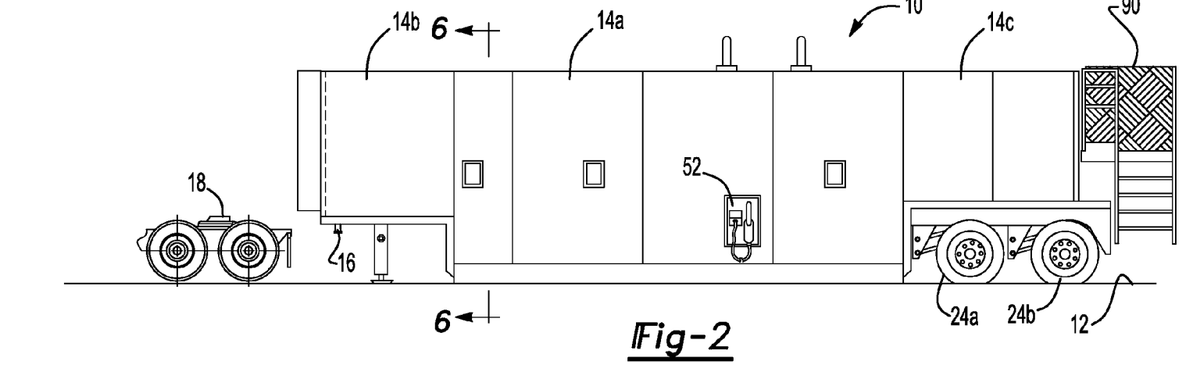
FIG. 2 is a side view of the vessel after having been lowered onto the ground at the refueling site.
Figure 3:
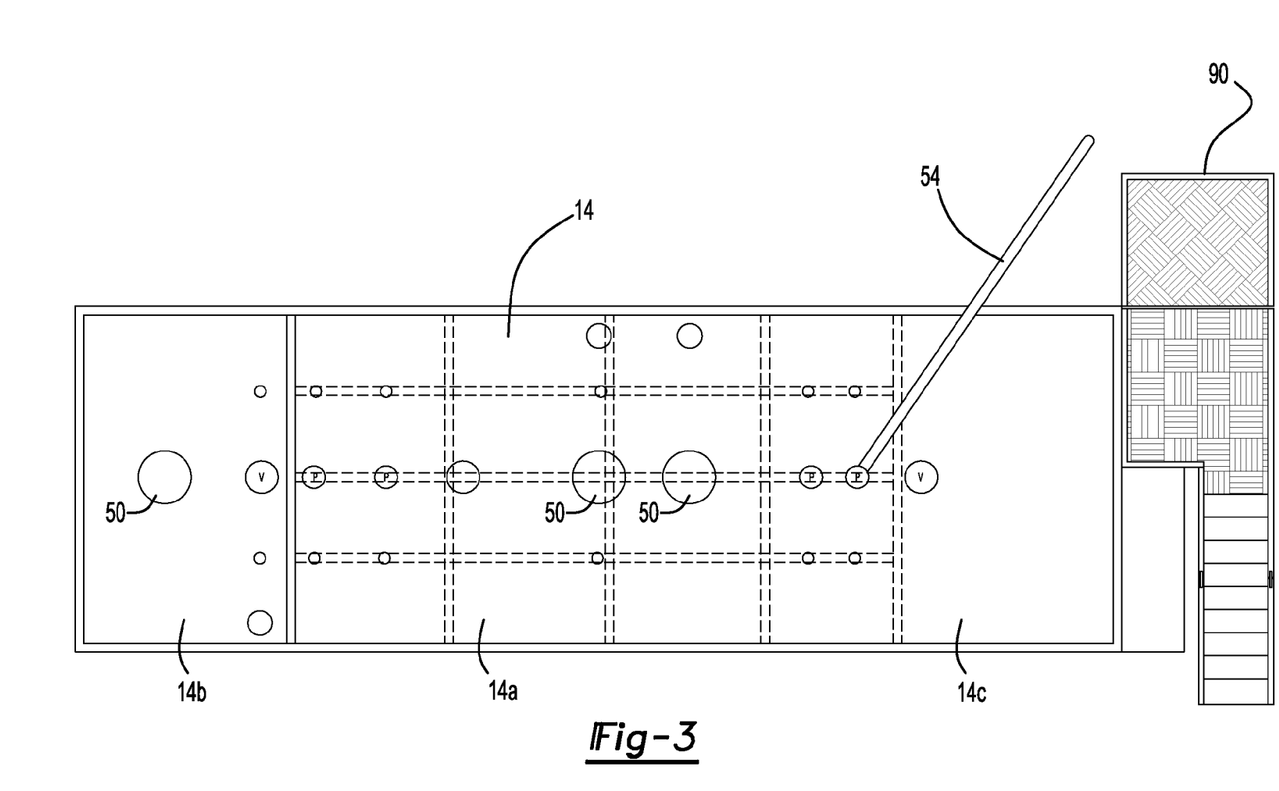
FIG. 3 is a top view thereof.

Referring now to FIGS. 1 and 2, a mobile refueling vessel 10 is illustrated. In FIG. 1, the vessel 10 is shown in a transporting configuration, while FIG. 2 shows the vessel 10 lowered onto the ground 12 at a refueling site. The vessel includes a tank 14 with one or more sections that carry fuel. As can be seen perhaps better in FIG. 3, the tank 14 is generally rectangular in shape and has a central tank section 14a, a front gooseneck tank section 14b and a rear gooseneck tank section 14c. Optionally, each of the tanks 14a, 14b and 14c can be filled with different types of fuel.

Returning now to FIGS. 1 and 2, the front tank section 14b includes a coupling device 16 which is removably coupled to a mating coupling device 18 on a tractor/truck 20 for towing the vessel 10.

Figure 9:
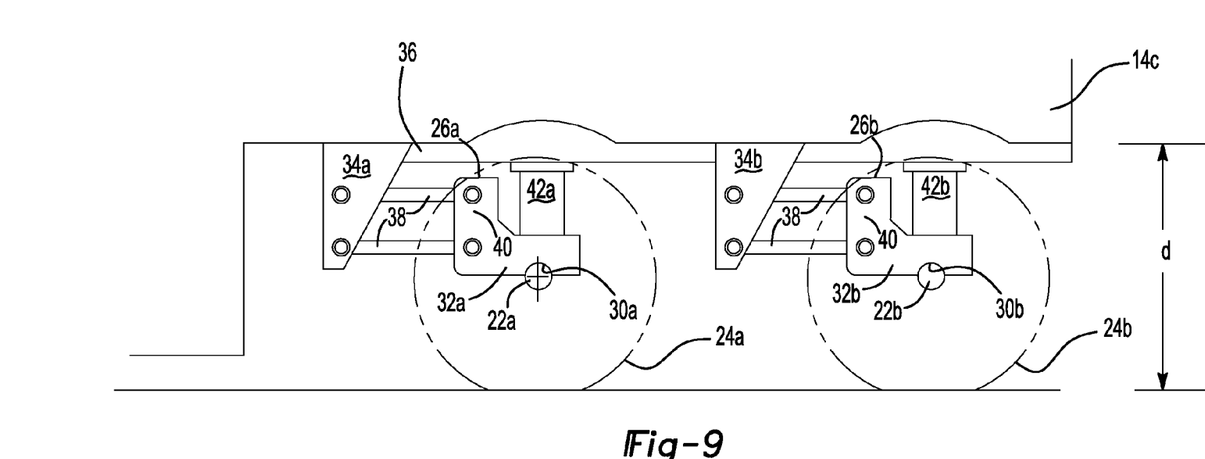
FIG. 9 is a side view of suspension components when the vessel is raised ready for transportation.
Figure 10:
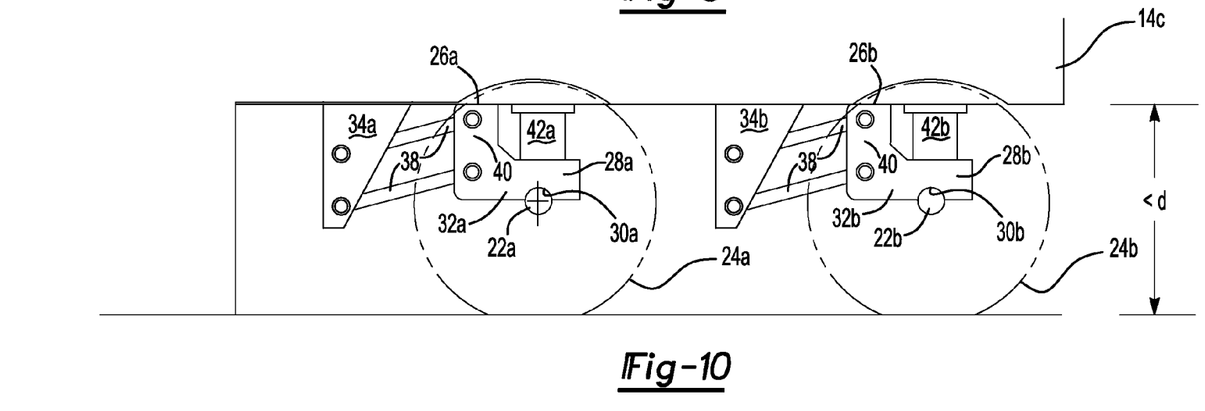
FIG. 10 is a view, similar to FIG. 9, in which the suspension components have lowered the vessel onto the ground.

In FIG. 1, the vessel 10 is raised so that the tank 14a is off of the ground 12. The raising and lowering mechanism for the vessel 10 is best shown in FIGS. 9 and 10. In this embodiment, the vessel 10 includes two rear axles 22a and 22b carrying tires 24a and 24b, respectively. Suspension components 26a and 26b comprise an L-shape axle mount component 28a, 28b. Each axle mount suspension component has a recess 30a, 30b in a lower portion of a horizontally extending leg 32a, 32b for receiving the axles 22a, 22b. A bracket 34a, 34b is fixed at its upper end to a frame portion 36 of the vessel and extends downwardly. Links 38 have their one ends pivotably connected to the bracket 34. Opposite ends of the links 38 are pivotably connected to a vertically extending leg 40 of the suspension component 26. Airbags 42a, 42b operate on the suspension components 26a, 26b to raise and lower their respective axles 22a, 22b thereby, in turn, raising and lowering the vessel 10. The upper end of the airbags 42a, 42b are fixed to a frame member 36 whereas the lower portion of the airbags are connected to an upper portion of the suspension components 26a, 26b. When the airbags 42a, 42b are inflated (by a manually actuable device on the vessel), the airbags push downwardly on the suspension components 26a, 26b to raise the vessel 10 as shown in FIG. 9. In contrast, when the airbags are deflated, the axles 22a, 22b move upwardly thereby lowering the vessel 10 onto the ground 12 as shown in FIG. 10.

Returning now to FIG. 2 where vessel 10 is shown resting on the ground and the truck 20 has been disconnected from the vessel 10. In this position, the vessel 10 is ready to dispense fuel to engines of a variety of different vehicles. With additional reference to FIG. 3, various ports 50 are provided on the top of the vessel 10 to allow the tanks to be filled with fuel. The vessel is provided with one or more side dispenser mechanisms such as the illustrated typical hose and nozzle configuration 52 located on the side of the vessel. In the preferred embodiment, the vessel 10 further includes a boom 54 that can be guided by a user standing on a rear docking station as will be discussed in more detail in connection with FIG. 5.

Figure 6:
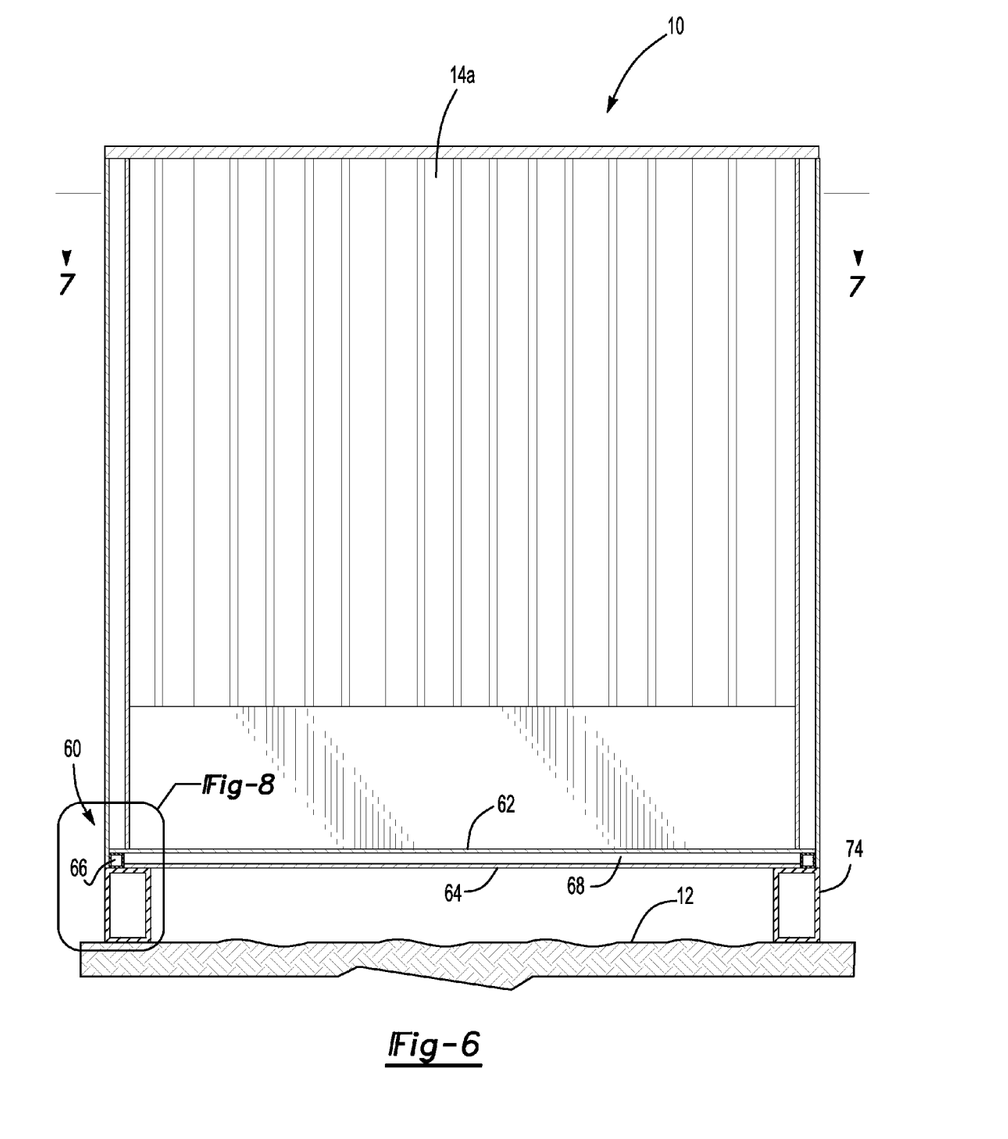
FIG. 6 a sectional view thereof taken along the lines of 6-6 of FIG. 2.
Figure 8:
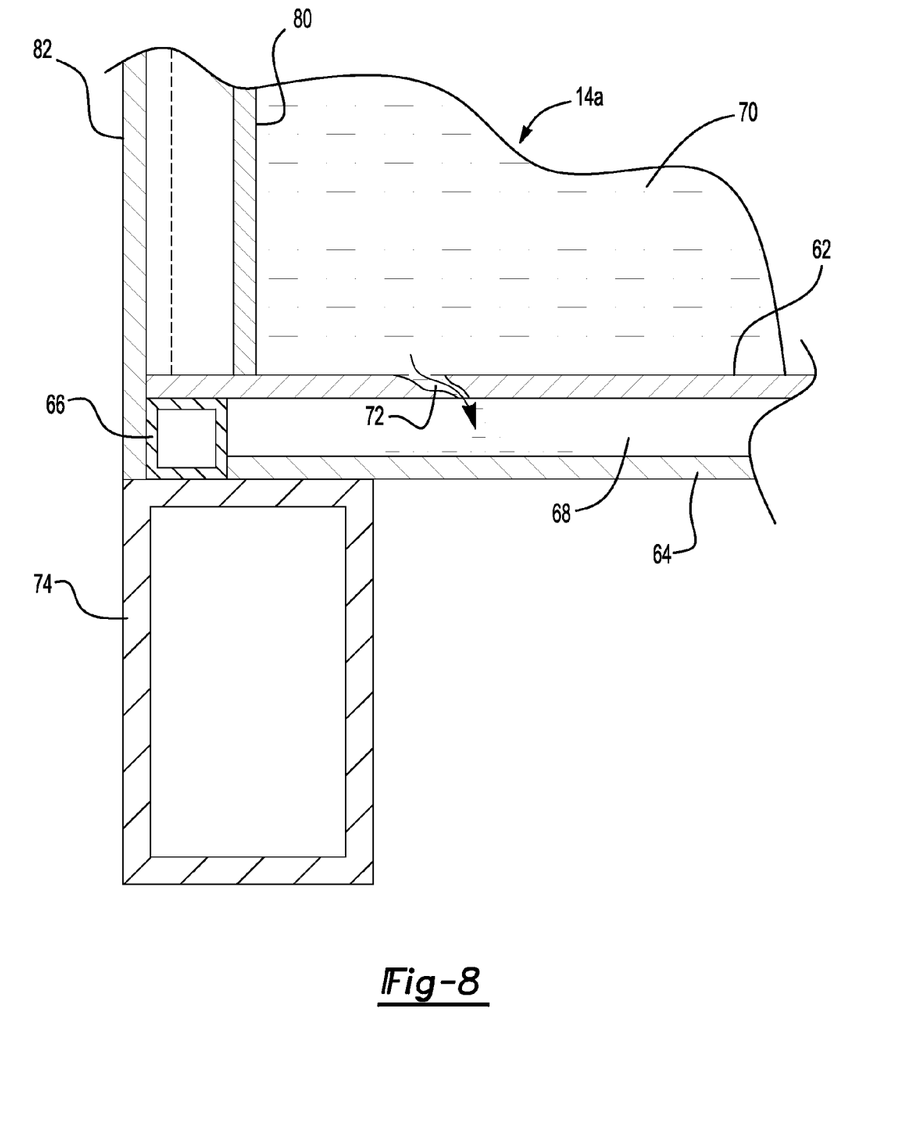
FIG. 8 is an enlarged partial cross-sectional view of the area labeled FIG. 8 in FIG. 6.

The vessel 10, especially the tank section 14a that rests on the ground, is constructed so that potential leaks from the tank are collected to ensure that the leaking fuel does not drip onto the ground to contaminate the environment. With particular reference to FIGS. 6 and 8, the central tank section 14a of vessel 10 includes a bottom portion generally designated by the numeral 60. A first rectangular plate defines the inner wall 62 of bottom portion 60. Another, similarly sized, rectangular plate 64 is spaced from the inner wall 62. A peripheral frame constructed of square tubing 66 serves as a spacer element between the inner wall 62 and lower plate 64 to define a gap 68 therebetween for collecting fuel that may leak from the tank 14a. This is best shown in FIG. 8 wherein fuel 70 is shown leaking at 72 through a hole or puncture in the inner wall 62. Since the present invention prevents fuel from leaking onto the ground 12, the conventionally used berms or bladders are not necessary to collect any leaking fuel.

A lower main frame 74 in the bottom portion 60 may be provided to increase the strength of the vessel 10. The main frame 74 is preferably constructed of larger rectangular tubing. Upper portions of the tubing of frame 74 are connected to peripheral portions of the lower plate 64 whereas the lower portion of frame 74 rests on the ground and raises the lower plate 64 above ground level.

Figure 7:
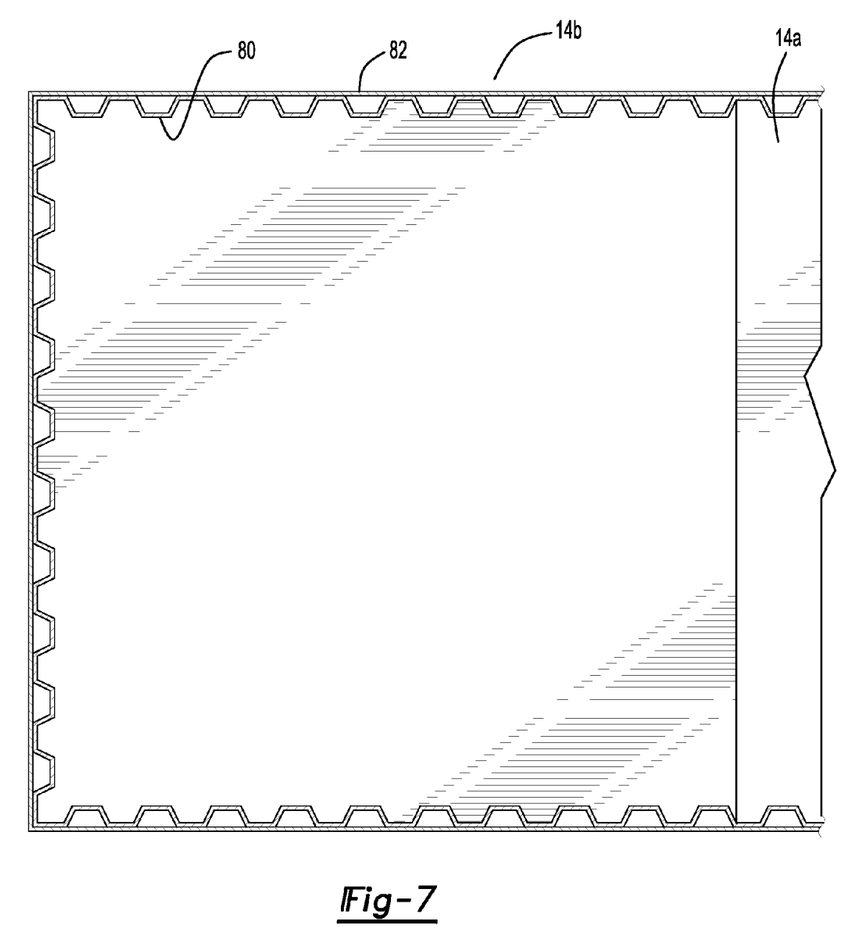
FIG. 7 is a sectional view thereof taken along the lines 7-7 of FIG. 6.

The sides of the vessel 10 are also preferably of a double walled construction. As seen best in FIG. 7, the inner walls of the sides are defined by a corrugated metal panel 80. Outer plates 82 are affixed to the inner panel 80 by welds or other suitable technique for securing the two metal members together.

Figure 4:
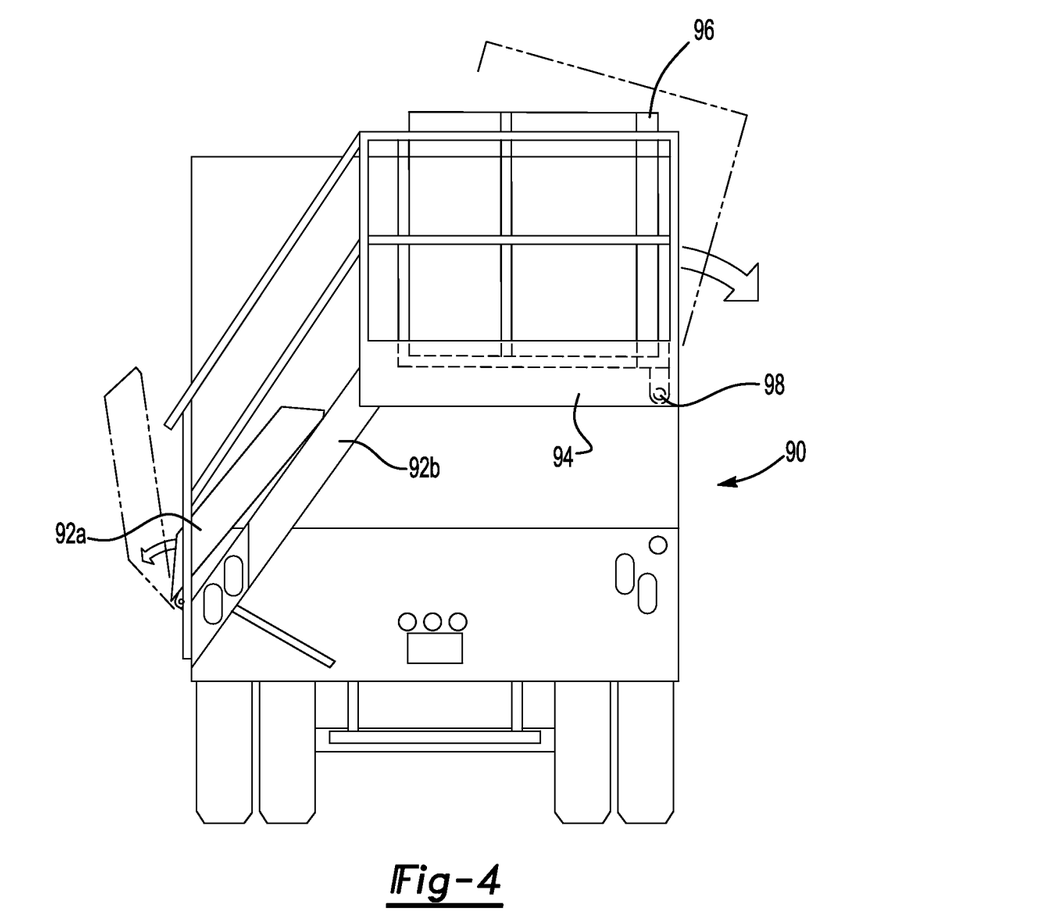
FIG. 4 is a rear view thereof showing a foldable docking station in its collapsed position.
Figure 5:
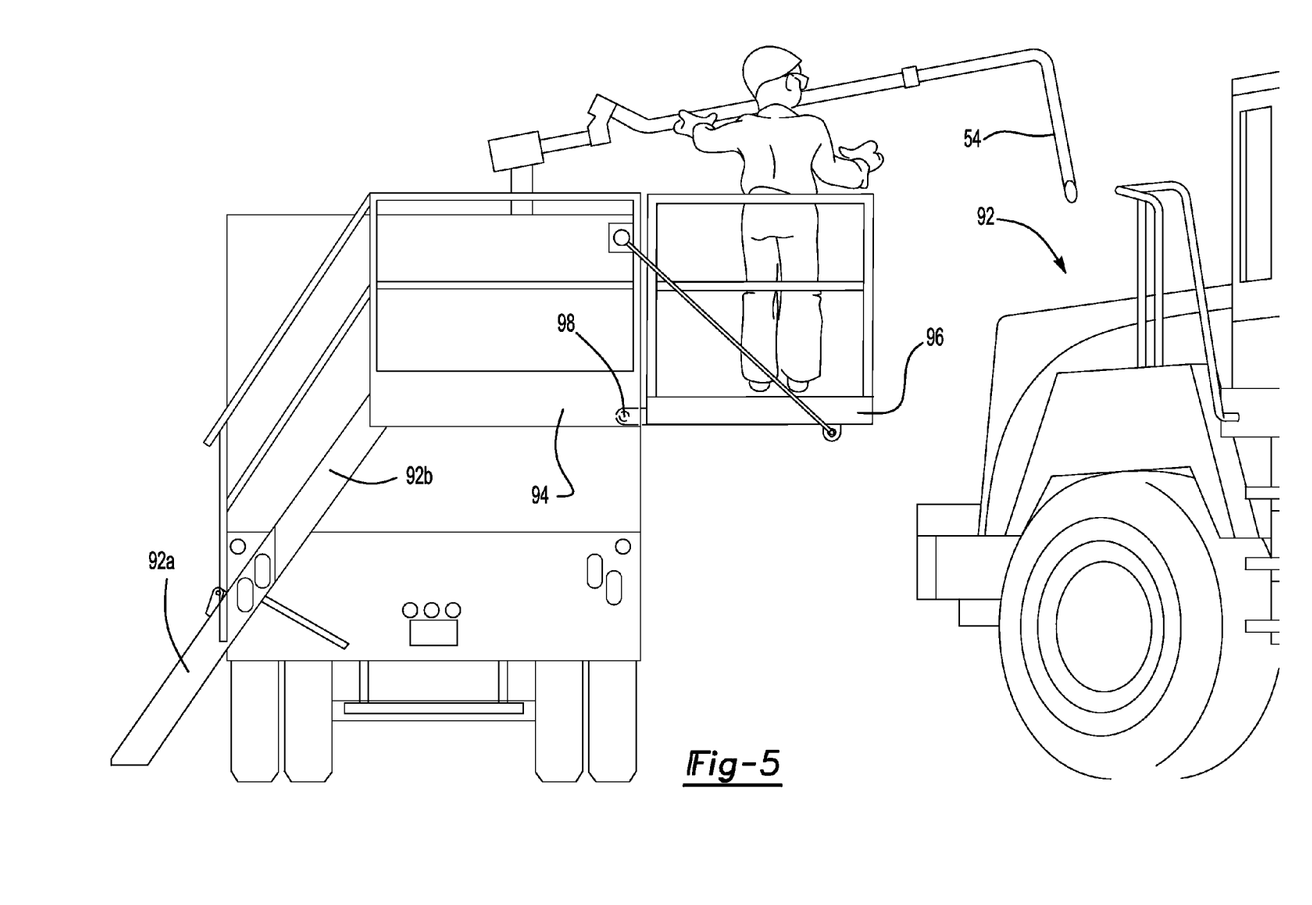
FIG. 5 is a rear view thereof showing the docking station in its extended position for refueling a vehicle.

In accordance with an aspect of this invention, a foldable docking station 90 is provided at the rear of the vessel 10. Referring to FIGS. 4 and 5, the docking station 90 is used by an operator to help refuel a vehicle 92 whose fuel inlet opening is at the top. FIG. 4 shows the docking station in its collapsed position. A ladder has two sections 92a and 92b pivotally connected together. The docking station 90 further includes a generally horizontal deck 94. A tiltable platform 96 is pivotally connected to deck 94 at pivot point 98. A suitable cable 100 is used to help secure the platform 96 in its extended position.

When in use, the ladder section 92a is folded outwardly towards the ground so that a user can climb onto the deck 94 and then onto platform 96 as shown in FIG. 5. Then, the operator can grasp a refueling boom 54 and swing it towards the vehicle fuel inlet opening to dispense fuel from the vessel 10 into the fuel tank of the vehicle 92.

When the vessel 10 is transported as shown in FIG. 1, the docking station 90 is folded into its collapsed position as best show in FIG. 4. There, the ladder section 92a is folded upwardly upon ladder section 92b. Similarly, the tiltable platform 96 is pivoted onto deck 94. In such manner, the foldable docking station 90 can be transported along with the rest of the vessel 10 more easily and present less wind resistance.

As will be appreciated the docking station 90 can be used separately on a wide variety of different refueling tanks and other vehicles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mobile vessel for refueling engines at remote refueling sites, comprising:
    a tank having sides, a top and a rectangular bottom portion;
    the bottom portion being configured to rest on the ground and having:
        an inner wall;
        a lower plate; and
        a spacer element between the inner wall and lower plate defining a gap therebetween for collecting fuel that may leak from the tank;
    the top having at least one port through which fuel in the tank can be dispensed;
    a foldable docking station on the front or rear end of the vessel, the docking station having a generally horizontal deck, a ladder extending from a first edge of the deck, and a tiltable platform pivotably connected to an opposite second edge of the deck;
    the ladder includes a first section extending from the first edge of the deck, and a second section pivotally connected to the first section;
    in a transport configuration, the docking station is folded in a collapsed position in which the second section of the ladder is folded onto the first section, and the tiltable platform is folded onto the deck such that the tiltable platform does not extend from the deck;
    in a refueling configuration, the docking station is unfolded from the collapsed position into an extended position in which:
        the second section of the ladder is folded off of the first section such that the second section extends outward from and laterally beyond the side of the tank of the mobile vessel; and
        the tiltable platform is tilted off of the deck such that the tiltable platform extends outward from the mobile vessel, the platform extends from the deck to provide a floor for a worker to stand on when refueling a vehicle from the port on the top of the tank.

2. The vessel of claim 1 which further comprises:
    a front end and a rear end;
    a coupling device on the front end for connecting to a coupling device on a vehicle for transporting the vessel;
    an axle having tires thereon under the rear end; and
    a raising and lowering mechanism for raising and lowering the axle to raise the vessel off the ground during transportation and to lower the vessel onto the ground when at a refueling site.

3. The vessel of claim 2 wherein the raising and lowering mechanism comprises an inflatable and deflatable air bag.

4. The vessel of claim 3 which further comprises:
    a suspension component; and
    wherein the air bag operates on the suspension component.

5. The vessel of claim 3 which further comprises:
    a bracket depending downwardly at the rear end;
    a pivotal link;
    an L-shaped axle mount suspension component having a recess on a lower portion of a horizontally extending leg for receiving the axle,
    the link having one end connected to the bracket and another end connected to a vertically extending leg of the suspension component; and
    wherein the air bag is located between an upper portion of the horizontally extending leg of the suspension component and a fixed member.

6. The vessel of claim 1 wherein the spacer element comprises square tubes.

7. The vessel of claim 1 wherein the sides comprise:
    an outer panel and an inner corrugated panel.

8. The vessel of claim 1 wherein the bottom portion further comprises a frame upon which the lower plate rests.

9. The vessel of claim 1 wherein the tank has three sections: a front gooseneck tank section, a middle section having said bottom portion thereon, a rear gooseneck section, and
    wherein said coupling device is located on a lower portion of the front gooseneck section; and
    wherein said docking station is on the rear gooseneck section.

10. A mobile vessel for refueling engines at remote refueling sites, comprising:
    a tank having sides, a top and a rectangular bottom portion;
    the bottom portion being configured to rest on the ground and having:
        an inner wall;
        a lower plate; and
        a spacer element between the inner wall and lower plate defining a gap therebetween for collecting fuel that may leak from the tank;
    the top having at least one port through which fuel in the tank can be dispensed;
    said sides including an outer panel and an inner corrugated panel; and
    a foldable docking station on the front or rear end of the vessel, the docking station having a generally horizontal deck, a ladder extending from a first edge of the deck, and a tiltable platform pivotably connected to an opposite second edge of the deck;
    the ladder includes a first section extending from the first edge of the deck, and a second section pivotally connected to the first section;
    in a transport configuration, the docking station is folded in a collapsed position in which the second section of the ladder is folded onto the first section, and the tiltable platform is folded onto the deck such that the tiltable platform does not extend from the deck;
    in a refueling configuration, the docking station is unfolded from the collapsed position into an extended position in which:
        the second section of the ladder is folded off of the first section such that the second section extends outward from and laterally beyond the side of the tank of the mobile vessel; and
        the tiltable platform is tilted off of the deck such that the tiltable platform extends outward from the mobile vessel, the platform extends from the deck to provide a floor for a worker to stand on when refueling a vehicle from the port on the top of the tank.

\* \* \* \* \*